United States Patent Office 3,213,677
Patented Oct. 26, 1965

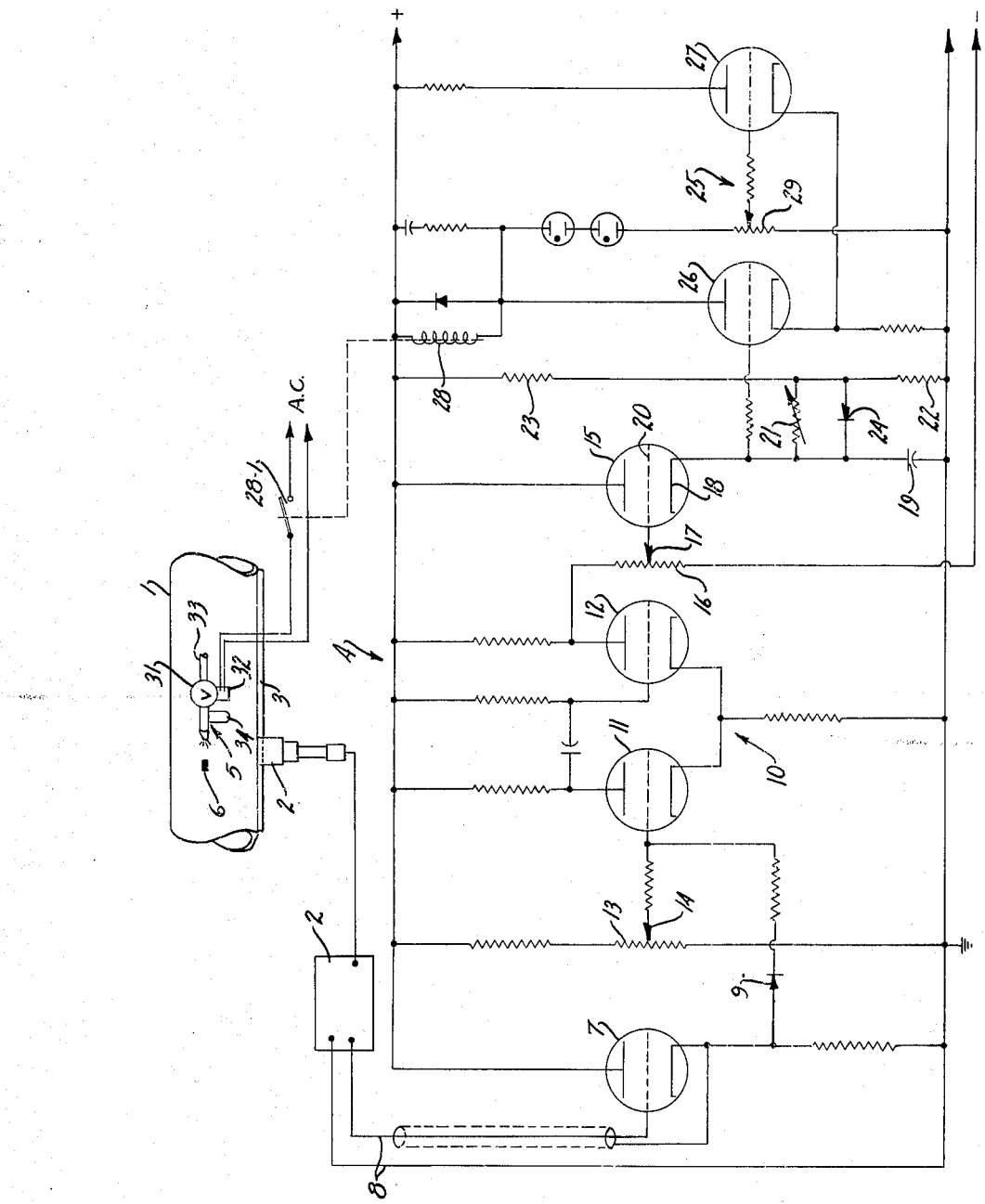

3,213,677
FLAW DETECTION RECORDING
Joseph R. Maklary, Milwaukee, Wis., assignor to A. O. Smith Corporation, Milwaukee, Wis., a corporation of New York
Filed June 28, 1962, Ser. No. 205,886
2 Claims. (Cl. 73—67.9)

This invention relates to flaw detection recording and particularly to a recording means for use with a sonic flaw detection apparatus for locating flaws in metal members and applying a mark to the metal member generally at the location of the flaw.

Non-destructive testing wherein the member is inspected for defects and flaws can advantageously be accomplished by the use of ultrasonic, supersonic and high frequency inspection devices. Normally, a series of shock waves or pulses of energy is transmitted into the workpiece. The velocity of the wave is known and the interval of time required for the wave to travel through the workpiece or to be reflected from a defect is therefore a measure and indication of the position of the defect.

The output signal in sonic detection systems is generally of an extremely small power level and duration. The signal cannot practically be sufficiently amplified for reliable and accurate defect recording by the direct operation of relatively high power marking and recording mechanisms.

Flaw detection of welded pipe is an example of a process which has been found to be advantageously done by sonic inspection for purposes of speed, reliability and accuracy. A longitudinal flash weld of a pipe forty feet in length was rapidly inspected by moving the pipe past an ultrasonic flaw detection unit which is more fully disclosed and claimed in the copending application of Lawrence Makous entitled Ultrasonic Flaw Detection, Serial No. 150,098, filed on November 3, 1961 and assigned to a common assignee herewith.

A visible mark is desirably applied directly to the pipe after it leaves the flaw detection unit preferably at the location of the flaw by suitable timed actuation of a suitable marking device. However, the flaw generated signals are generally unsuitable for actuation of the control circuit of a suitable marking device.

The present invention is particularly directed to a circuit which accepts the small flaw created pulses and establishes a control pulse or pulses of sufficient power and duration for actuating marking means and placing a mark on the pipe at the location of the flaw.

In accordance with the present invention, the flaw created pulses are fed to a suitable squaring circuit which establishes a square wave pulse of predetermined amplitude and width. Each square wave pulse is slightly greater than one-half the period between successive inspection pulses. Consequently, if immediately succeeding inspection pulses produce flaw-created pulses, the operating circuit for the marking device is held in an enabling state and the mark which is applied to the work is generally proportional to the length of the flaw.

The mark on the pipe can be made sufficiently large to allow visual inspection from a removed viewing station for rapid manual checking of the inspected member.

The drawing furnished herewith illustrates the best mode presently contemplated for carrying out the invention.

The drawing is a schematic circuit including a diagrammatically illustrated pipe inspecting unit.

Referring to the drawing, a pipe section 1 is movably mounted for longitudinal movement past an ultrasonic flaw detection unit 2 for rapidly inspecting a longitudinal weld 3. An actuating circuit 4 is connected to the output of the flaw detection unit 2 and connected to control a spray gun 5 of any suitable variety. The spray gun 5 is mounted adjacent the path of the inspected pipe and is actuated to provide a visible mark 6 on the pipe at the location of a flaw, not shown.

The ultrasonic flaw detection unit 1 may be of any suitable variety for example such as disclosed in the previously referred to copending application of Lawrence Makous. As more fully described therein, time spaced pulses are transmitted into the pipe 1 and reflected from a generally radial portion of a flaw within the weld 3 to establish a flaw-related signal which is fed back to the flaw detection unit 2. Generally, it has been found that the signals are of a 10 to 20 microsecond duration.

The actuating circuit 4 which is connected to receive the flaw related signals includes a cathode follower 7 connected by a cable 8 to the output of the flaw detection unit 2. The cathode follower 7 is a conventional electronic circuit and is effective to cancel out any stray cable capacitance in the connection of the circuit 4 to the flaw detection unit 2 while maintaining the pulse duration of the flaw related pulses.

A diode 9 connects the output of the cathode follower 7 to a monostable multivibrator 10. In the illustrated embodiment of the invention, a pair of vacuum tubes 11 and 12 are interconnected in a well-known manner to establish the monostable multivibrator 10. Tube 12 is biased to conduct in the non-triggered condition of multivibrator 10. An input pulse to tube 11 from follower 7 however transfers conduction from tube 12 to tube 11 for a selected period and thereby establishes an output pulse of a corresponding period at tube 12. The diode 9 effectively disconnects the multivibrator 10 from the cathode follower 7 during the remaining interval of each pulse.

A grid bias control resistor 13 includes a tap 14 connected to the tube 11 of the multivibrator 10. The resistor 13 establishes a trigger level and sets the trigger sensitivity so that small noise pulses and the like do not trip the multivibrator 10. The multivibrator 10 always reverts to the selected D.C. voltage bias which the input pulse must exceed for triggering thereof.

The output pulse of tube 12 is of uniform width and height and the period of each output pulse from multivibrator 10 is made substantially less, by proper selection of circuit elements, than the period between successive pulses. The latter prevents overlapping between adjacent pulses and establishes a distinct train of output pulses.

A cathode follower 15 has its input connected to the output tube 12 of the multivibrator 10 through a suitable potentiometer 16. A tap 17 on the potentiometer 16 is connected to follower 15 and manually adjustable for adjusting of the bias on the cathode follower 15. The tap 16 is set to establish a zero D.C. voltage with respect to ground in the absence of a pulse from the multivibrator 10.

Generally, the cathode follower 15 includes cathode 18 which is connected in series with a capacitor 19 to ground. The tap 17 of potentiometer 16 is set to hold an input grid 20 of follower 15 at zero D.C. voltage with respect to ground in the absence of a pulse from multivibrator 10. The cathode 18 is at a corresponding relatively zero D. C. voltage and no charge appears across the capacitor 19.

An incoming pulse from the multivibrator 10 biases the cathode follower 15 to conduct and the capacitor 19 charges as a result of current in the cathode circuit. At the end of the incoming pulse, the capacitor 19 is fully charged and, as subsequently described, controls actuation of the spray gun 5.

An adjustable resistor 21 and a fixed resistor 22 are connected to form a discharge circuit for the capacitor 19. The resistors 21 and 22 determine the time rate of discharge and consequently determine the length of time the charge on the capacitor 19 is maintained.

The fixed resistor 22 is connected in series with a fixed resistor 23 to form a voltage dividing circuit connected across a suitable power supply, not shown. A small diode 24 is connected in parallel with the adjustable resistor 21 and establishes the maximum voltage across the capacitor 19. If the voltage is greater than the predetermined maximum level, the diode 24 conducts and shunts the current from around the capacitor 19. As a result of the small diode 24, the control of gun 5 is made dependent upon the width of the pulse created by charging and discharging of capacitor 19 and generally independent of the pulse height. The pulse width is determined by the adjustment of the resistor 21.

A multivibrator 25 generally similar to the multivibrator 10 includes vacuum tubes 26 and 27 interconnected in a suitable multivibrator circuit. Tube 27 is connected as the normally conducting portion of the circuit and tube 26 is connected to conduct for a given period in response to an incoming triggering signal from follower 15.

A relay coil 28 for actuating gun 5 is connected in the plate circuit of the tube 26 and is energized for the period tube 26 conducts.

An adjustable potentiometer 29 is connected in the circuit of the tube 27 in a well-known manner and determines the conduction period of the tube 26 after the triggering pulse established by capacitor 19 disappears.

The relay coil 28 controls a set of relay contacts 28–1 for operating a solenoid valve 31 of gun 5. Contacts 28–1 are connected in a power circuit of a solenoid 32 which is coupled to actuate the valve 31.

The gun 5 is diagrammatically illustrated as an air-operated spray type having an air-line 33 which is normally closed by valve 31. When solenoid 32 is opened, the valve 31 opens the line 33 and air passes through the gun 5 and by a syphon action, carries a marking liquid from a container 34 through the nozzle or tip of the gun. The mark 6 results.

The operation of the illustrated embodiment of the invention is summarized as follows.

The pipe 1 is positioned with the weld 3 in alignment with the flaw detection unit 2 and is axially moved thereby. The flaw detection unit 2 is simultaneously energized to generate a series of closely time-spaced pulses which are transmitted to the pipe 1. In the presence of a flaw, each of the transmitted pulses is reflected therefrom and establishes a corresponding flaw-related pulse. The pulses may, for example, be fed into the pipe at a rate of 300 pulses per second and consequently, in the presence of a flaw, corresponding flaw-related pulses are established at the output of the unit 2.

The pulses are fed to follower 7 and then to the multivibrator 10 which establishes a series of pulses of given height and width. The pulse width is selected by adjustment of tap 14 to be approximately one-half the minimum period between flaw-related pulses.

Each pulse from multivibrator 10 biases the cathode follower 15 to conduct and fully charges the capacitor 19 to the maximum level permitted by the diode 24.

Assuming a single pulse is transmitted, the capacitor 19 is charged completely and at the end of the pulse begins immediately to discharge through the adjustable resistor 21 and the fixed resistor 22. The tube 26 of the multivibrator 25 is biased to conduct and triggers the multivibrator 25 at a selected switching level to transfer the current from tube 27 to the tube 26.

The relay coils 28 are then energized and close the contacts 28–1 to complete the power circuit of solenoid 32. Energization of solenoid 32 opens the valve 31 for a corresponding period and operates the spray gun 5 to establish the mark 6 on the pipe 1.

As the capacitor 19 discharges, the bias on the tube 26 of multivibrator 25 decreases and drops below the trigger level of the multivibrator 25. The multivibrator 25 maintains current through the relay coil 28 for a timed period in accordance with the setting of the variable potentiometer 29.

The potentiometer 29 is set to maintain current flow through the relay coil generally for a period corresponding to the period between successive pulses which are generated by a single flaw in the member. Consequently, if successive pulses are established by a flaw, the second pulse biases the cathode follower 15 to conduct and again charges the capacitor 19 above the trigger level of the multivibrator 25 before the voltage on capacitor 19 decreases to the drop-out value. The relay coil 28 is therefore maintained energized for a period corresponding to successive pulses plus a period corresponding to one pulse. The mark 6 is then substantially proportional to the length of the defect.

The present invention thus provides a sensitive and responsive marking device in a flaw detection system and allows establishing of a distinct visible mark. The control operator can be located relatively remote from the inspection station and note the necessity for repair or rejection of a pipe 1.

Various modes of carrying out the invention are contemplated as being within the scope of the following claims particularly pointing out and distinctly claiming the subject matter which is regarded as the invention.

I claim:

1. Flaw detection marking apparatus for applying a mark on a metallic member at the location of a flaw, which comprises an ultrasonic flaw detection unit establishing a series of time spaced input sonic pulses, means to move the metallic member past the detection unit whereby a series of flaw related pulses of a width of the order of microseconds is established in the presence of a flaw, an electronic timing circuit connected to the output of the detection unit and including means to establish a control signal of an operative duration corresponding to about half the period between the pulse signals and means responsive to said control signal to form a continuous control signal during the period adjacent sonic input pulses corresponding flaw related pulses, and an electroresponsive marking means connected to the output of the electronic timing circuit and mounted adjacent the path of the metallic member to mark the metallic member at the location of a flaw and in proportion to the size of the flaw.

2. The flaw detection marking apparatus of claim 1 wherein the timing circuit includes an output multivibrator connected to the electroresponsive marking means and a one-shot multivibrator and a capacitor connected as an input to the output multivibrator, said capacitor being charged by a pulse from the one-shot multivibrator to maintain timed energization of the output multivibrator and the marking means.

References Cited by the Examiner

UNITED STATES PATENTS

| 2,499,413 | 3/50 | Proskauer et al. | 328—58 X |
| 2,618,687 | 11/52 | Straehl | 346—33 X |
| 2,655,620 | 10/53 | Coleman | 209—111.7 |
| 3,051,956 | 8/62 | Theobald | 73—67.9 X |

FOREIGN PATENTS 736,464   9/55   Great Britain.

LEYLAND M. MARTIN, *Primary Examiner.*

DAVID SCHONBERG, RICHARD QUEISSER,
*Examiners.*